(12) United States Patent
Fukuyama (10) Patent No.: US 10,570,996 B2
(45) Date of Patent: Feb. 25, 2020

(54) SHOE FOR CHAIN GUIDE AND FOR CHAIN TENSIONER ARM, AND CHAIN GUIDE AND CHAIN TENSIONER ARM PROVIDED WITH SAID SHOE

(71) Applicant: BorgWarner Inc., Auburn Hills, MI (US)

(72) Inventor: Hiroyuki Fukuyama, Mie (JP)

(73) Assignee: BorgWarner Inc., Auburn Hills, MI (US)

(*) Notice: Subject to any disclaimer, the term of this patent is extended or adjusted under 35 U.S.C. 154(b) by 291 days.

(21) Appl. No.: 15/520,978

(22) PCT Filed: Oct. 20, 2015

(86) PCT No.: PCT/US2015/056310
§ 371 (c)(1),
(2) Date: Apr. 21, 2017

(87) PCT Pub. No.: WO2016/069315
PCT Pub. Date: May 6, 2016

(65) Prior Publication Data
US 2017/0350474 A1    Dec. 7, 2017

(30) Foreign Application Priority Data

Oct. 30, 2014 (JP) ................. 2014-221710

(51) Int. Cl.
*F16H 7/08* (2006.01)
*F16H 7/18* (2006.01)

(52) U.S. Cl.
CPC .............. *F16H 7/08* (2013.01); *F16H 7/18* (2013.01); *F16H 2007/0872* (2013.01); *F16H 2007/0893* (2013.01); *F16H 2007/185* (2013.01)

(58) Field of Classification Search
CPC ....... F16H 2007/185; F16H 2007/0872; F16H 2007/0819; F16H 7/18; F16H 7/08
(Continued)

(56) References Cited

U.S. PATENT DOCUMENTS 7,641,577 B2 * 1/2010 Markley ................. F16H 7/08
 474/109
2004/0058761 A1 * 3/2004 Konno .................... F16H 7/08
 474/111

(Continued)

FOREIGN PATENT DOCUMENTS

JP  2000097300 A  4/2000
JP  2013083292 A  5/2013
(Continued)

OTHER PUBLICATIONS

International Search Report for PCT/US2015/056310 dated Jan. 7, 2016.

*Primary Examiner* — Michael R Mansen
*Assistant Examiner* — Raveen J Dias
(74) *Attorney, Agent, or Firm* — Brown & Michaels, PC (57) ABSTRACT

To simplify a structure and reduce costs. A shoe for a chain guide or for a chain tensioner arm is constructed. Here, a shoe (3) has a chain sliding surface (30) on which a chain slides. A locking protrusion such as a clip, a tab or a hook for locking the shoe (3) to a tensioner arm main body (2) of a chain tensioner arm (1) is not provided on an end surface of the shoe (3) or on a surface on the rear side of the chain sliding surface (30). Furthermore, the shoe (3) has a uniform cross-sectional shape over the whole length and extends linearly in the longitudinal direction.

13 Claims, 13 Drawing Sheets

(58) Field of Classification Search
USPC .......................................................... 474/111
See application file for complete search history.

(56) References Cited

U.S. PATENT DOCUMENTS

| | | | | |
|---|---|---|---|---|
| 2004/0132570 A1* | 7/2004 | Takeda | ...................... | F16H 7/08 |
| | | | | 474/111 |
| 2008/0032836 A1* | 2/2008 | Konno | ...................... | F16H 7/18 |
| | | | | 474/140 |
| 2012/0295747 A1* | 11/2012 | Ishikawa | ................... | F16H 7/18 |
| | | | | 474/140 |
| 2013/0053197 A1 | 2/2013 | Konno et al. | | |
| 2013/0059688 A1 | 3/2013 | Konno et al. | | |
| 2013/0090201 A1* | 4/2013 | Mori | ........................ | F16H 7/18 |
| | | | | 474/140 |
| 2014/0187371 A1* | 7/2014 | Lee | ........................... | F16H 7/18 |
| | | | | 474/140 |
| 2014/0243132 A1* | 8/2014 | Kurematsu | ............... | F16H 7/18 |
| | | | | 474/140 |
| 2014/0274513 A1* | 9/2014 | Ishikawa | ................... | F16H 7/18 |
| | | | | 474/140 |
| 2014/0274514 A1* | 9/2014 | Mori | ........................ | F16H 7/18 |
| | | | | 474/140 |
| 2015/0219190 A1* | 8/2015 | Geibel | ...................... | F16H 7/18 |
| | | | | 474/111 |
| 2016/0069432 A1* | 3/2016 | Wach | ....................... | F16H 7/18 |
| | | | | 474/111 |
| 2018/0038476 A1* | 2/2018 | Konno | ...................... | F16H 7/06 |

FOREIGN PATENT DOCUMENTS

| | | |
|---|---|---|
| JP | 2013164134 A | 8/2013 |
| KR | 1020130018541 A | 2/2013 |

\* cited by examiner

SHOE FOR CHAIN GUIDE AND FOR CHAIN TENSIONER ARM, AND CHAIN GUIDE AND CHAIN TENSIONER ARM PROVIDED WITH SAID SHOE

TECHNICAL FIELD

The present invention relates to a shoe (face) attached to a chain guide or to a chain tensioner arm, and more specifically the present invention relates to an improved structure therefor.

PRIOR ART

In a chain device, e.g. a timing chain system in an automobile engine, a chain guide for guiding travel of a chain is generally provided on a tension-side span of the chain, while a chain tensioner arm for applying a tensioning force to the chain is generally provided on a slack-side span of the chain.

A conventional chain guide and chain tensioner arm are provided with a main body section and a shoe made of resin, for example, which is provided on the chain abutment side of the main body section, as described in JP 2000-97300 A. The shoe is provided with a plurality of locking hooks (see paragraph [0016] and FIG. 1, FIG. 2 and FIG. 4-FIG. 6 of the abovementioned publication), and the shoe is attached to the main body section by way of these locking hooks.

SUMMARY OF THE INVENTION

Problem to be Solved by the Invention

In this conventional arrangement, protrusions such as these locking hooks are provided on the shoe, so simple upper/lower dies disposed in the vertical direction of the shoe are inadequate as molding dies when the shoe is molded, and a die is also required in the widthwise direction of the shoe, which increases the manufacturing cost.

The present invention has been devised in view of this situation with the conventional technology, and the problem to be solved by the present invention lies in providing a shoe for a chain guide or for a tensioner arm, the structure of which can be simplified and the cost of which can be reduced.

Means for Solving the Problem

In order to solve the abovementioned problem, the present invention provides a shoe which is used together with a guide main body of a chain guide for guiding travel on a tension-side span of a chain, or with a tensioner arm main body of a chain tensioner arm for applying a tensioning force to a slack-side span of the chain, said shoe being characterized in that it comprises a chain sliding surface on which the chain slides and does not comprise a locking protrusion which locks with the guide main body or the tensioner arm main body (see claim 1).

According to the present invention, a locking protrusion which locks with the guide main body or the tensioner arm main body is not provided on the shoe, so the structure of the shoe can be simplified. This not only makes it possible to reduce the cost of materials, the shoe can also be molded using only upper/lower dies as the shoe molding dies, so the cost of the dies can also be reduced and the manufacturing cost can be reduced as a result.

According to the present invention, the shoe does not have the locking protrusion protruding from the surface on the opposite side to the chain sliding surface (see claim 2).

According to the present invention, the shoe has a uniform cross-sectional shape at least in a region excluding an end section of the shoe (see claim 3). This makes it possible to further simplify the structure of the shoe and to further reduce the manufacturing cost.

According to the present invention, the shoe has a uniform cross-sectional shape over the whole length (see claim 4). This makes it possible to further simplify the structure of the shoe and to further reduce the manufacturing cost. Furthermore, according to the present invention, the shoe can be molded by means of extrusion molding so it is possible to shorten the unit molding time and the manufacturing cost can be even further reduced.

According to the present invention, the shoe extends linearly in the longitudinal direction (see claim 5). In this case, the flow direction of molten material can be arranged in a single direction when the shoe is molded by means of injection molding, and as a result the thickness of the shoe can be reduced so the cost of materials can be further reduced, while the cost of the dies can also be further reduced because the dies can be made thinner overall, which enables the manufacturing cost to be further reduced. Furthermore, according to the present invention, the shoe can be molded by means of extrusion molding, so it is possible to shorten the unit molding time and the manufacturing cost can be further reduced.

In addition, friction loss when the chain slides can be reduced by virtue of the fact that the shoe can be made thinner and it is possible to increase the limit PV value, and heat generated when the chain slides is readily released to the guide main body or the tensioner arm main body side, so it is possible to restrict an increase in chain temperature.

According to the present invention, the shoe comprises, on the chain sliding surface, a guide section for guiding the traveling chain (see claim 6).

According to the present invention, the guide section is disposed at a position remote from a widthwise end surface of the shoe (see claim 7).

A chain guide according to the present invention is provided with: a guide main body extending in the longitudinal direction; and a shoe which is attached to the guide main body and has a chain sliding surface on which the chain slides, the shoe not comprising a locking protrusion which locks with the guide main body, and the guide main body comprising a locking part for locking the shoe (see claim 8).

According to the present invention, a locking protrusion which locks with the guide main body is not provided on the shoe so it is possible to simplify the structure of the shoe. This not only makes it possible to reduce the cost of material for the shoe, the shoe can also be molded using only upper/lower dies as the shoe molding dies, so the cost of the dies can also be reduced and the manufacturing cost can be reduced as a result.

According to the present invention, the locking part is provided on an end section of the guide main body and has a locking recess into which an end section of the shoe is inserted (see claim 9).

A chain tensioner arm according to the present invention is provided with: a tensioner arm main body extending in the longitudinal direction; and a shoe which is attached to the tensioner arm main body and has a chain sliding surface on which the chain slides, the shoe not comprising a locking protrusion which locks with the tensioner arm main body, and the tensioner arm main body comprising a locking part for locking the shoe (see claim 10).

According to the present invention, a locking protrusion which locks with the tensioner arm main body is not provided on the shoe so it is possible to simplify the structure of the shoe. This not only makes it possible to reduce the cost of material for the shoe, the shoe can also be molded using only upper/lower dies as the shoe molding dies, so the cost of the dies can also be reduced and the manufacturing cost can be reduced as a result.

According to the present invention, the locking part is provided on an end section of the tensioner arm main body and has a locking recess into which the shoe is inserted (see claim 11).

According to the present invention, the shoe is produced by means of injection molding or extrusion molding (see claim 12).

Advantage of the Invention

As described above, according to the present invention, a locking protrusion which locks with a guide main body or a tensioner arm main body is not provided on a shoe so it is possible to simplify the structure of the shoe; this is advantageous in that not only is it possible to reduce the cost of materials, the shoe can also be molded using only upper/lower dies as the shoe molding dies, so the cost of the dies can also be reduced and the manufacturing cost can be reduced as a result.

MODE FOR IMPLEMENTING THE INVENTION

An exemplary embodiment of the present invention will be described below with reference to the appended drawings.

FIG. 1 to FIG. 13 illustrate a shoe according to an exemplary embodiment of the present invention and an example of the application thereof. An example will be described here in which the shoe is used on a chain tensioner arm disposed on a slack-side span of a chain, but the shoe according to this exemplary embodiment may equally be used in the same way on a chain guide disposed on a tension-side span of a chain (although this is not shown in the drawings).

Figure 1:
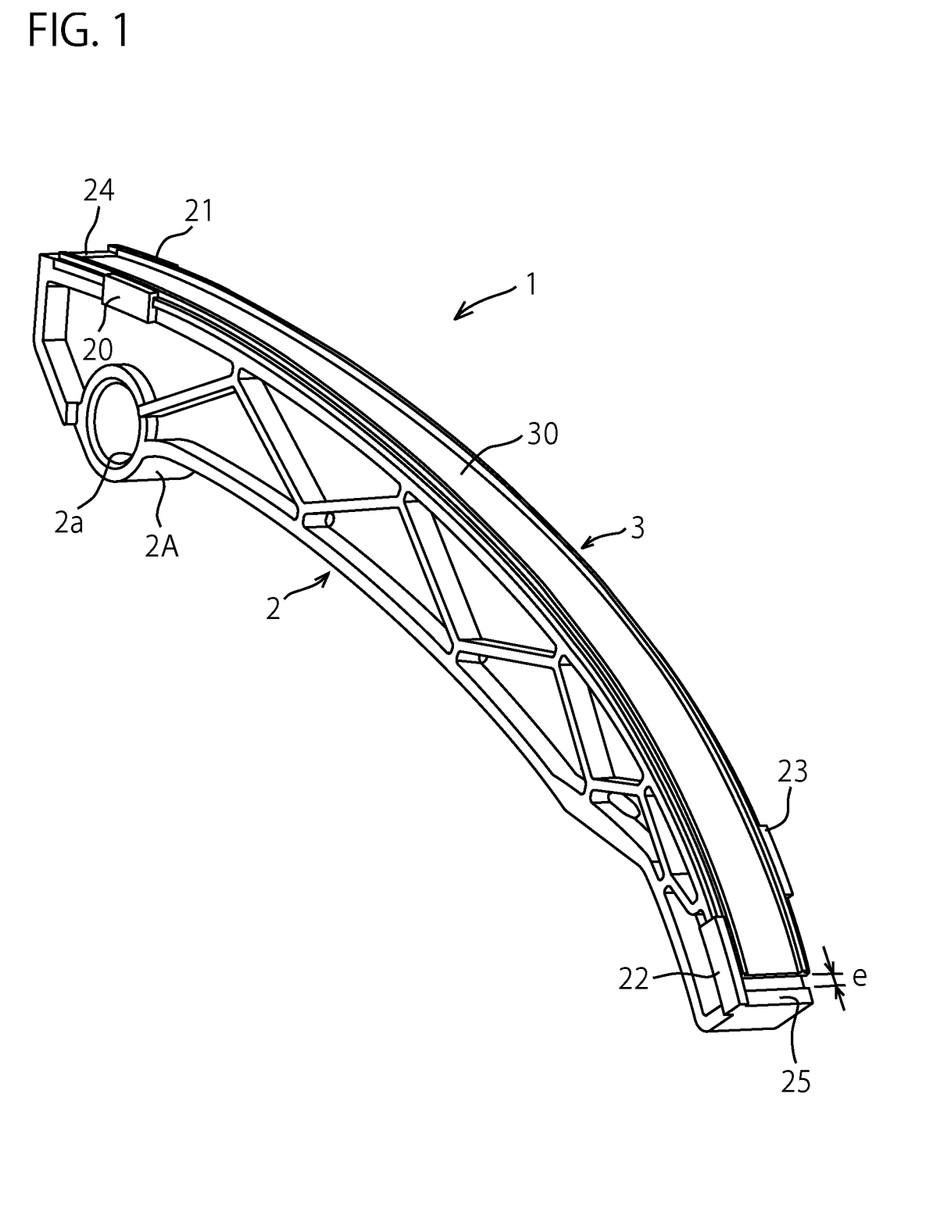
FIG. 1 is an overall oblique view of a chain tensioner arm provided with a shoe according to an exemplary embodiment of the present invention.

As shown in FIG. 1, a chain tensioner arm 1 comprises: a tensioner arm main body 2 having at a first end a boss part 2A and a pivot hole 2a formed passing therethrough; and a shoe 3 which is attached to the upper part of the tensioner arm main body 2. The tensioner arm main body 2 has a plurality of locking parts 20, 21, 22, 23 for locking the shoe 3. The tensioner arm main body 2 is molded as a single piece from a reinforced resin containing glass fibers, for example, but it may equally be made of a metal such as diecast aluminum, or it may be reinforced with a metal reinforcing material after the resin has been molded, for example. The shoe 3 has a chain sliding surface 30 on which a traveling chain (not depicted) slides. The shoe 3 is made of resin, for example.

Figure 2:
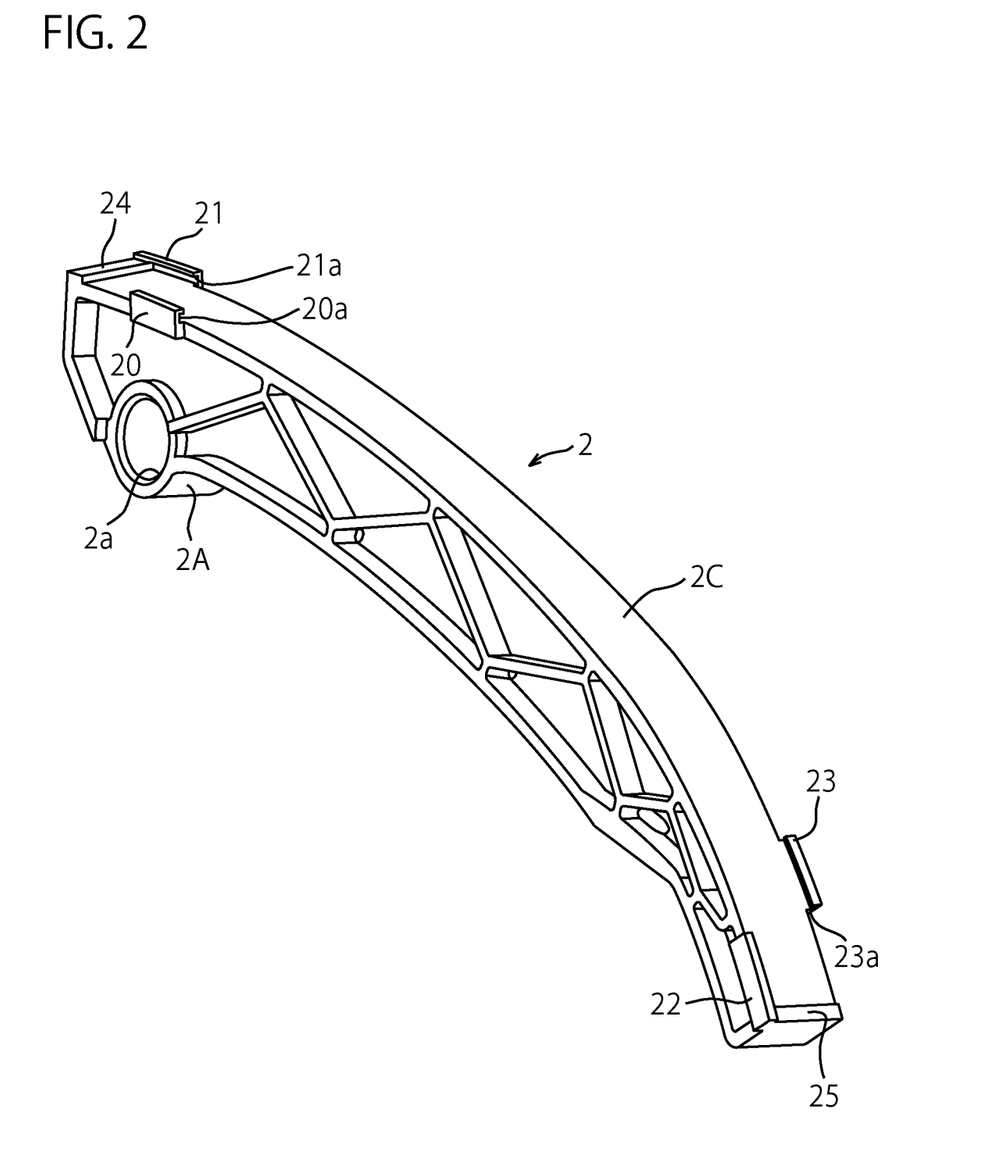
FIG. 2 is an overall oblique view of a tensioner arm main body forming part of the chain tensioner arm (FIG. 1)
Figure 3:
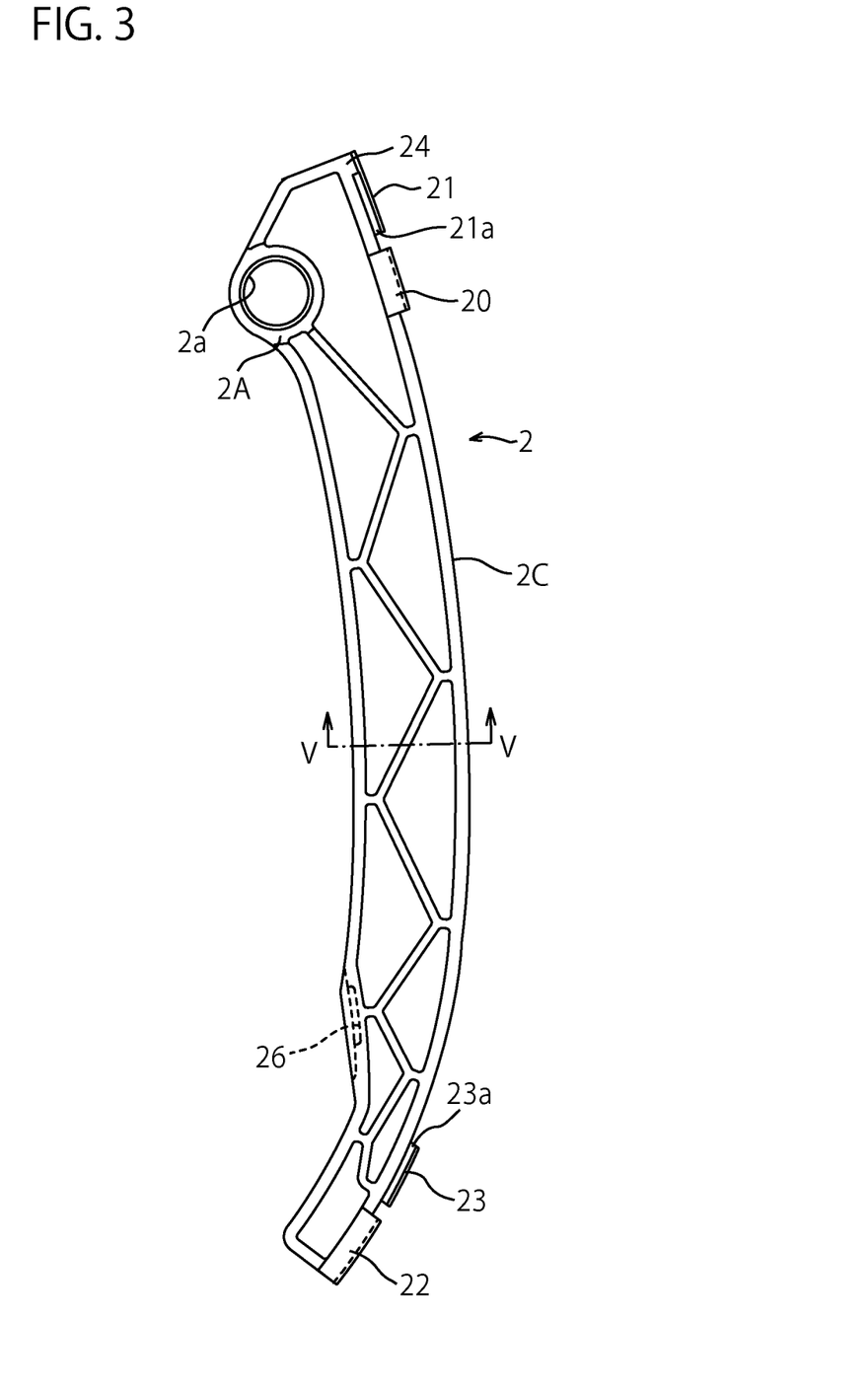
FIG. 3 is a schematic front view of the tensioner arm main body (FIG. 2)
Figure 4:
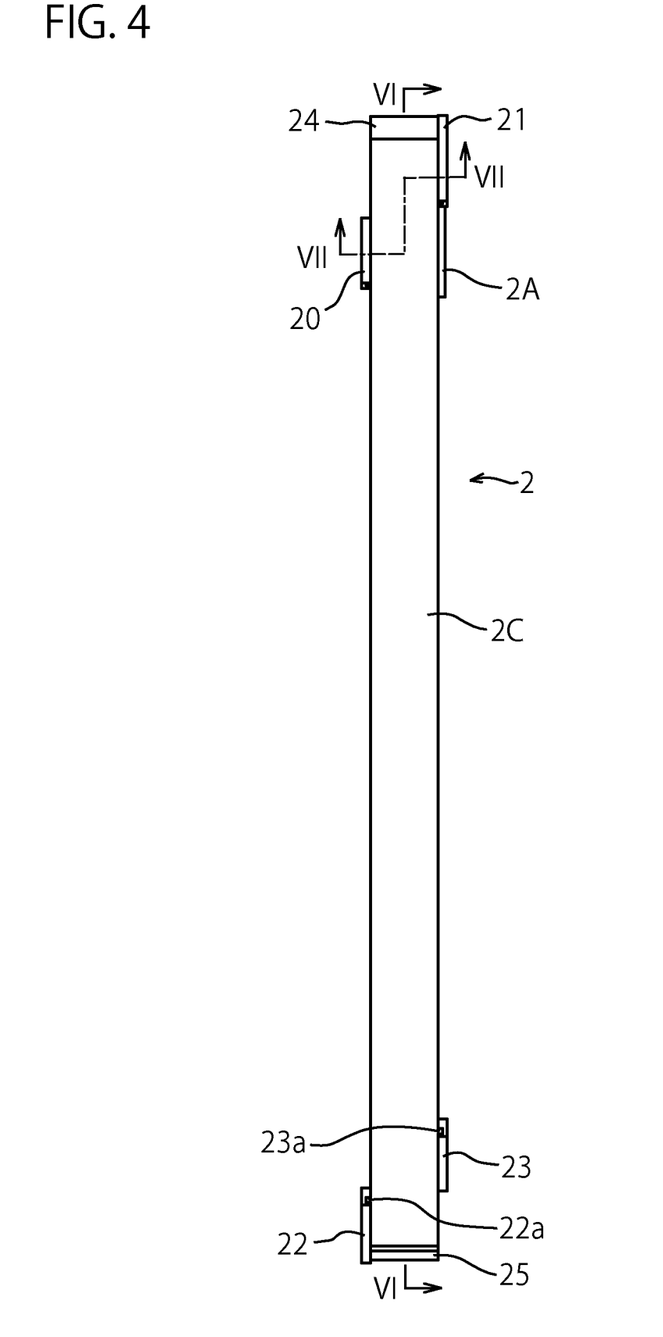
FIG. 4 is a schematic plan view of the tensioner arm main body (FIG. 2)

As shown in FIG. 2 and FIG. 3, the tensioner arm main body 2 has an upper surface 2C which curves in the shape of an arc. The upper surface 2C forms an abutment surface which is abutted by the lower surface of the shoe 3 when said shoe 3 is attached. An upright wall section 24 which is raised from the upper surface 2C is provided at a longitudinal end section of the upper surface 2C at the first end of the tensioner arm main body 2 (i.e., the pivoting end on the boss part 2A side), and an upright wall section 25 which is raised from the upper surface 2C is likewise provided at a longitudinal end section of the upper surface 2C at a second end of the tensioner arm main body 2 (i.e., the free end) (see FIG. 4). When the shoe 3 is mounted on the upper surface 2C, a first end of the shoe 3 can abut the upright wall section 24, and at this point a predetermined gap e (see FIG. 1) is formed between a second end of the shoe 3 and the upright wall section 25. The gap e serves to absorb thermal expansion of the shoe 3. It should be noted that in this case the chain travels from the second end of the shoe 3 toward the first end.

Figure 5:
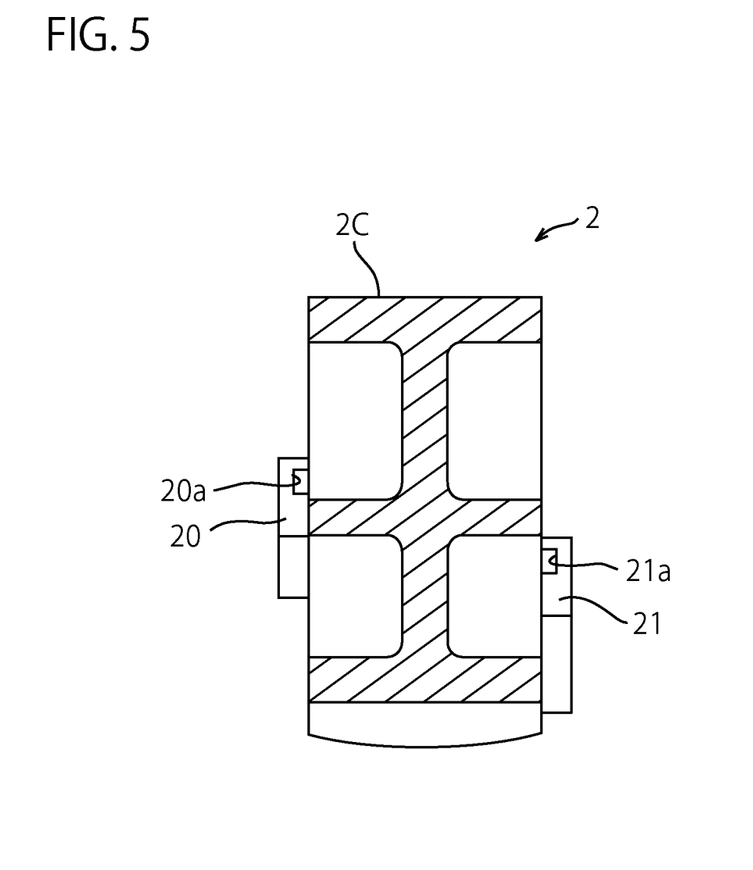
FIG. 5 is a view in cross section along the line V-V in FIG. 3.
Figure 6:
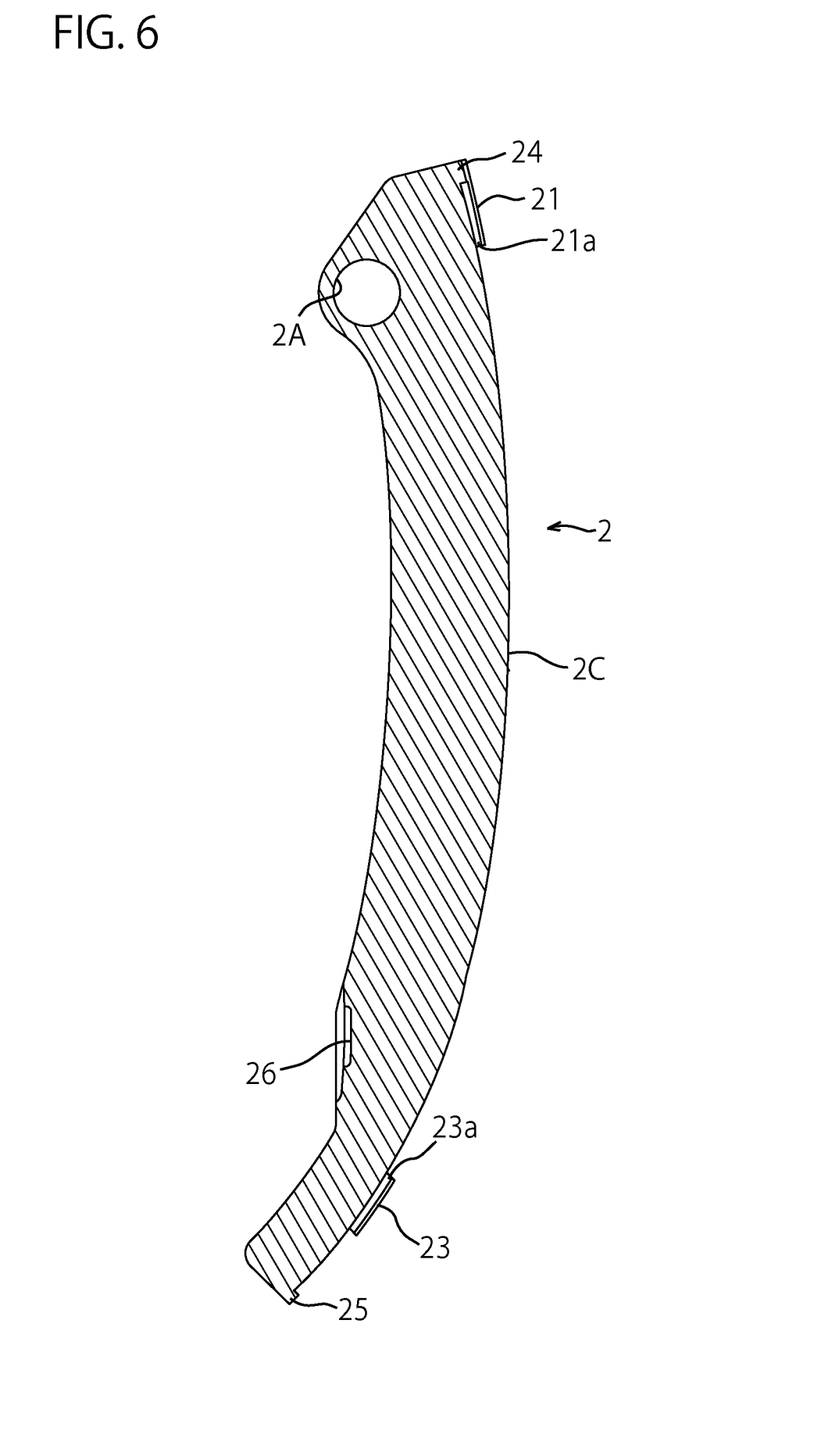
FIG. 6 is a view in cross section along the line VI-VI in FIG. 4.
Figure 7:
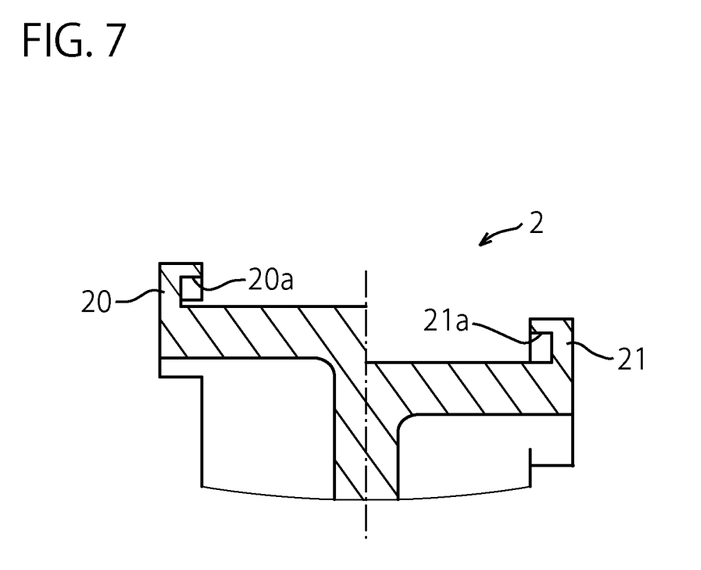
FIG. 7 is a view in cross section along the line VII-VII in FIG. 4.

Slits 20a, 21a, 22a, 23a extending along the upper surface 2C are formed in the locking parts 20, 21, 22, 23, respectively, of the tensioner arm main body 2 (see FIG. 5 to FIG. 7). The slits 20a, 21a, 22a, 23a serve to lock the widthwise end sections of the shoe 3. The locking parts 20, 21 are disposed at the first end (the pivoting end) of the tensioner arm main body 2, and the locking parts 22, 23 are disposed at the second end of the tensioner arm main body 2. The locking parts 20, 21 do not face each other in the widthwise direction and are offset from each other. The locking parts 22, 23 likewise do not face each other in the widthwise direction and are offset from each other (see FIG. 2 to FIG. 4). Furthermore, an engaging recess 26 which is engaged by the tip end of a piston of a tensioner (not depicted) for applying a pressing force to the second end of the tensioner arm main body 2 is formed at the second end of the tensioner arm main body 2 (see FIG. 3 and FIG. 6).

Figure 8:
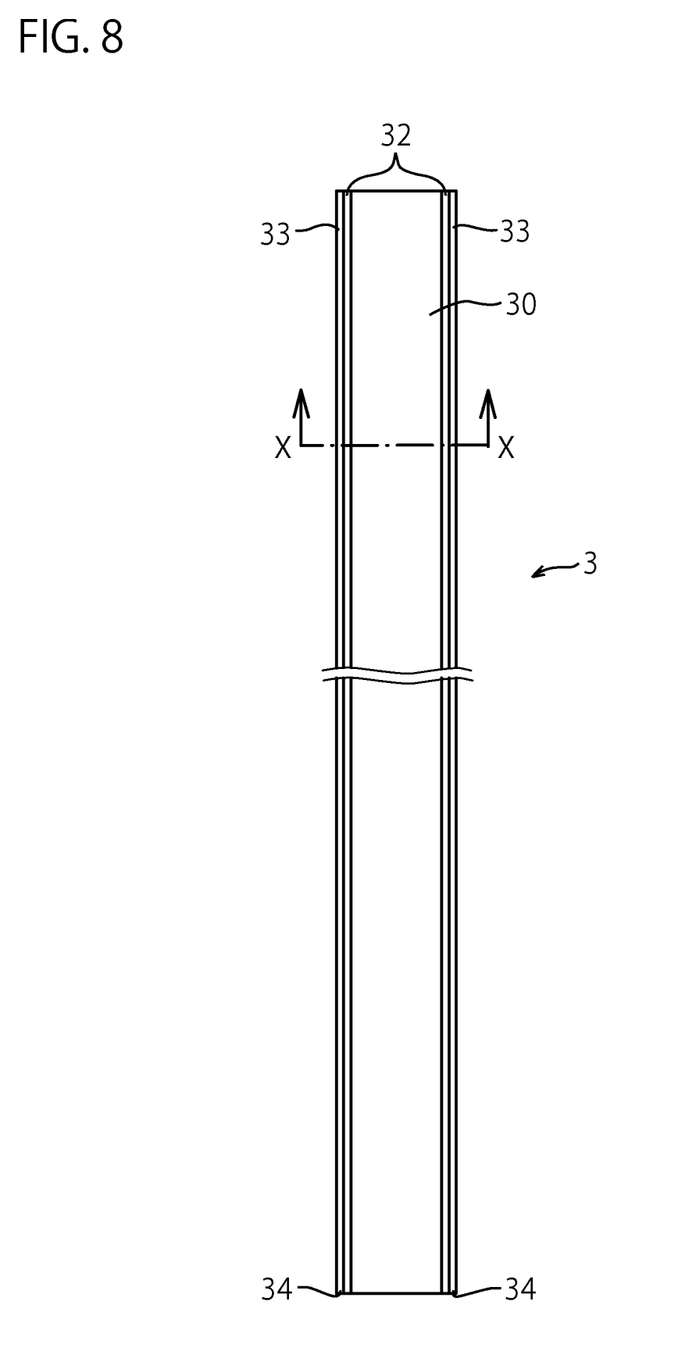
FIG. 8 is a plan view of a shoe forming part of the chain tensioner arm (FIG. 1)
Figure 9:
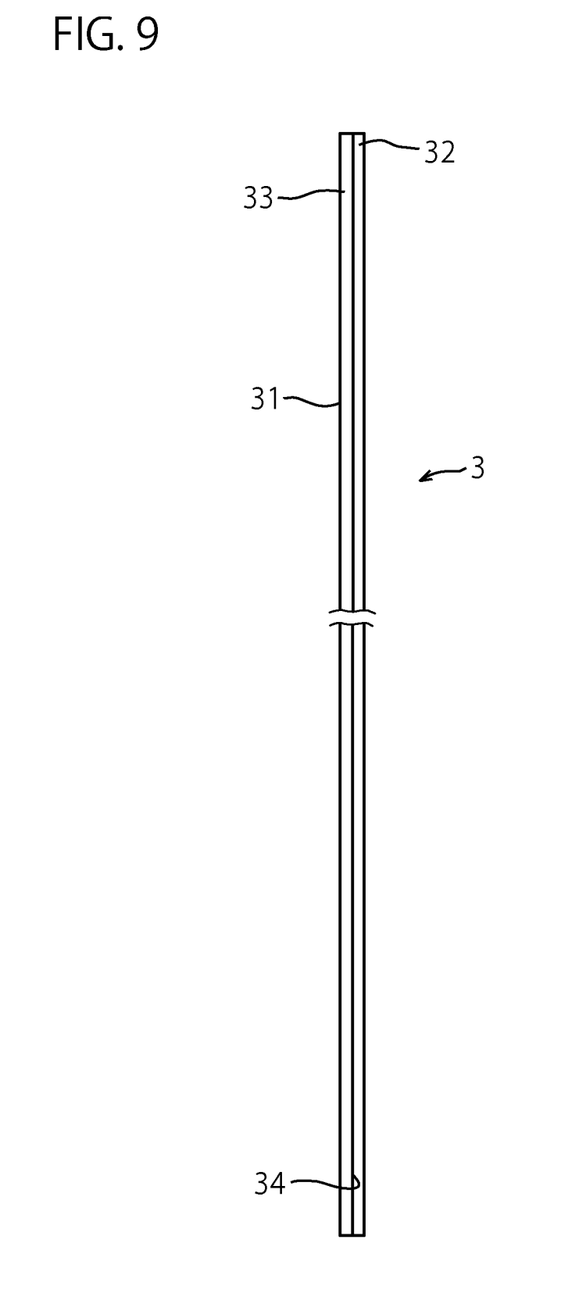
FIG. 9 is a front view of the shoe (FIG. 8)
Figure 10:
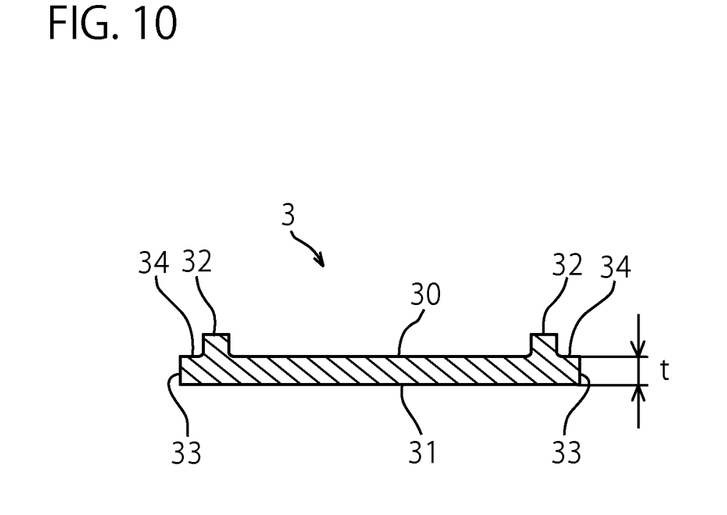
FIG. 10 is a view in cross section along the line X-X in FIG. 8.

As shown in FIG. 8 to FIG. 10, the shoe 3 is such that locking parts, which are substantially thin plate-shaped members extending linearly in the longitudinal direction and include locking protrusions such as clips, tabs or hooks for locking the shoe 3 to the tensioner arm main body 2, are not provided on an end surface of the shoe 3 or on a surface (lower surface) on the rear side of the chain sliding surface 30. The shoe 3 has a uniform cross-sectional shape over the whole length in the longitudinal direction.

A pair of guides (rails) 32 extending in the longitudinal direction along the chain sliding surface 30 while rising from the chain sliding surface 30 are provided at positions in the vicinity of both widthwise edges of the chain sliding surface 30. The guides 32 serve to guide the traveling chain. The guides 32 are disposed at positions which are offset slightly inward from widthwise end surfaces 33 of the shoe 3, and a small-width flat surface 34 is formed between the guides 32 and the widthwise end surfaces 33. The widthwise end sections of the shoe 3 including the flat surface 34 are adapted to be inserted into the slits 20a, 21a, 22a, 23a in the locking parts 20, 21, 22, 23 of the tensioner arm main body 2 when the shoe 3 is attached to the tensioner arm main body 2. The thickness t of the shoe 3 (FIG. 10) is set at no greater than 1.5 mm, for example. It should be noted that the thickness t as referred to herein indicates the distance between the chain sliding surface 30 (or flat surface 34) and a lower surface 31.

The method for manufacturing the shoe 3 will be described next.

As mentioned above, the shoe 3 has an external shape such as that shown in FIG. 8 and FIG. 9, and also has a cross-sectional shape such as that shown in FIG. 10; when the shoe 3 is molded by means of injection molding, it can therefore be produced by means of an upper die and a lower die which divide the region around the cross-sectional shape shown in FIG. 10 vertically in two, and there is no need for a widthwise die or a core. Furthermore, in this example, the shoe 3 extends linearly in the longitudinal direction and the cross-sectional shape thereof is uniform over the whole length, so it can also be produced by means of extrusion molding. It should be noted that the issue of whether to use injection molding or extrusion molding as the molding method depends not only on the cross-sectional shape of the molded article, but also on the physical properties of the resin material. For example, in the case of a high-viscosity material, the material has low fluidity and the molten material does not readily flow, so extrusion molding is preferred; in the case of a low-viscosity material, on the other hand, the material has high fluidity and the molten material readily flows, so injection molding is preferred.

Specific resin materials which may be used for the shoe 3 include: PA66 (polyamide 66), PA46 (polyamide 46), PA66+PTFE (polyamide 66 and polytetrafluoroethylene), and PA46+PTFE (polyamide 46 and polytetrafluoroethylene), but this is not limiting.

A method for assembling the chain tensioner arm 1 having the abovementioned structure will be described next with the aid of FIG. 11 to FIG. 13.

Figure 11:
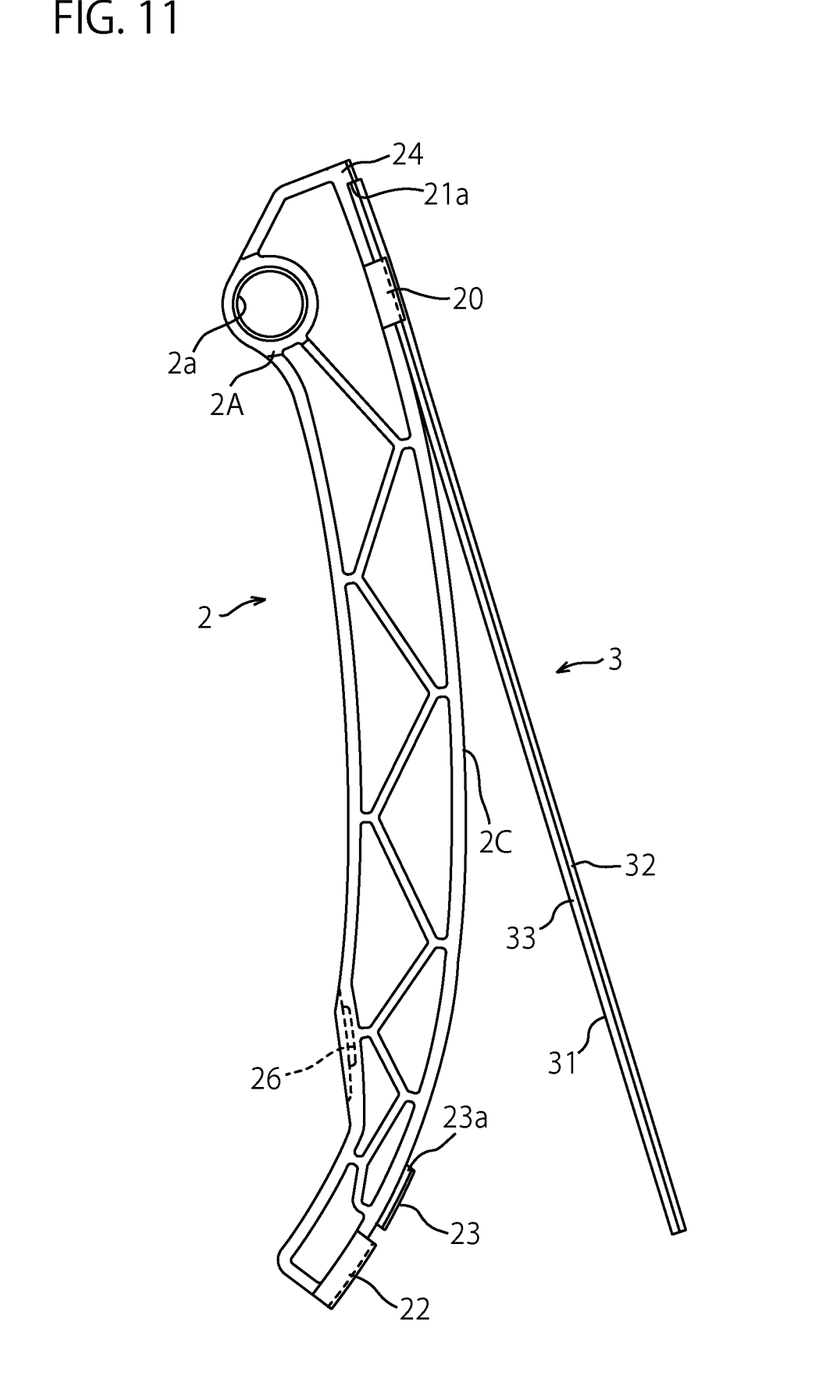
FIG. 11 illustrates a step in the assembly of the chain tensioner arm (FIG. 1)

As shown in FIG. 11, in order to attach the shoe 3 to the tensioner arm main body 2, the first end of the shoe 3 is first of all mounted at the first end (the pivoting end) of the tensioner arm main body 2. Here, the widthwise end sections at the first end of the shoe 3 are inserted into the slits 20a, 21a in the locking parts 20, 21 provided at the first end (pivoting end) of the tensioner arm main body 2, and the first end of the shoe 3 is made to slide toward the first end of the tensioner arm main body 2 whereby the first end of the shoe 3 is placed in abutment with the upright wall section 24 of the tensioner arm main body 2.

Figure 12:
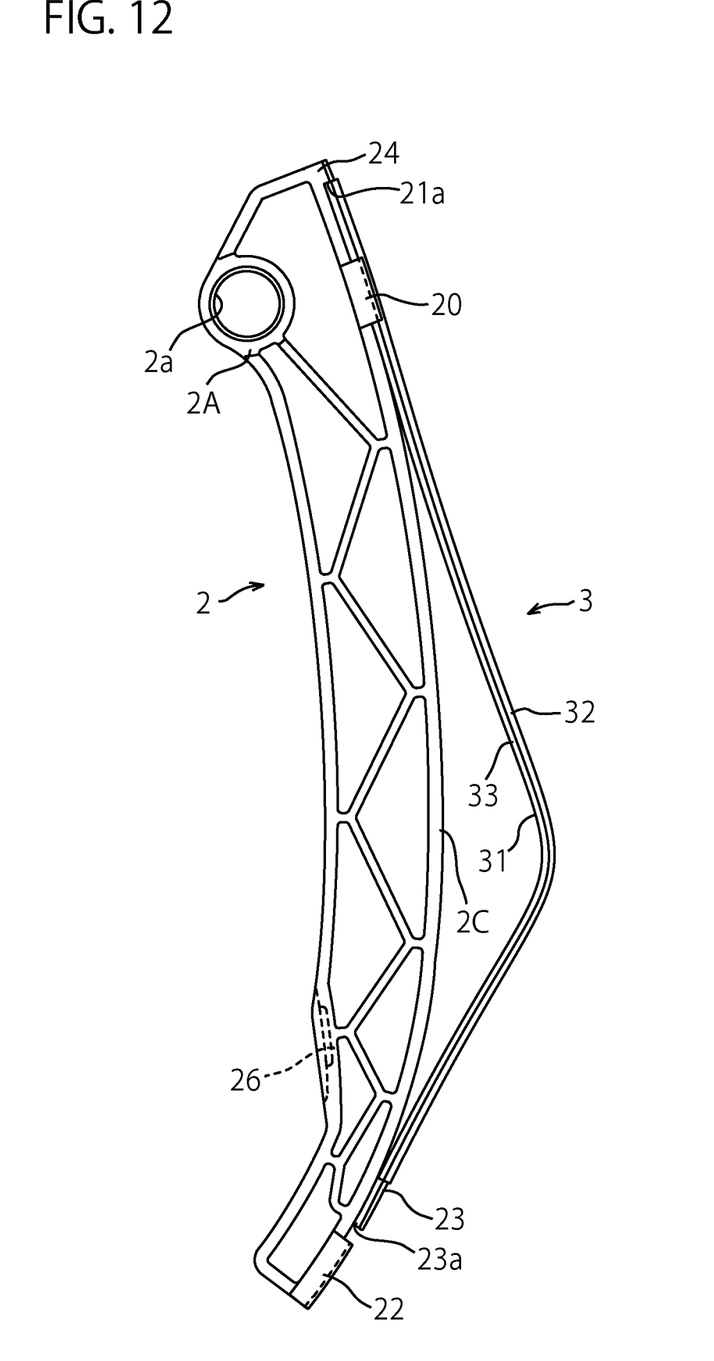
FIG. 12 illustrates a step in the assembly of the chain tensioner arm (FIG. 1)
Figure 13:
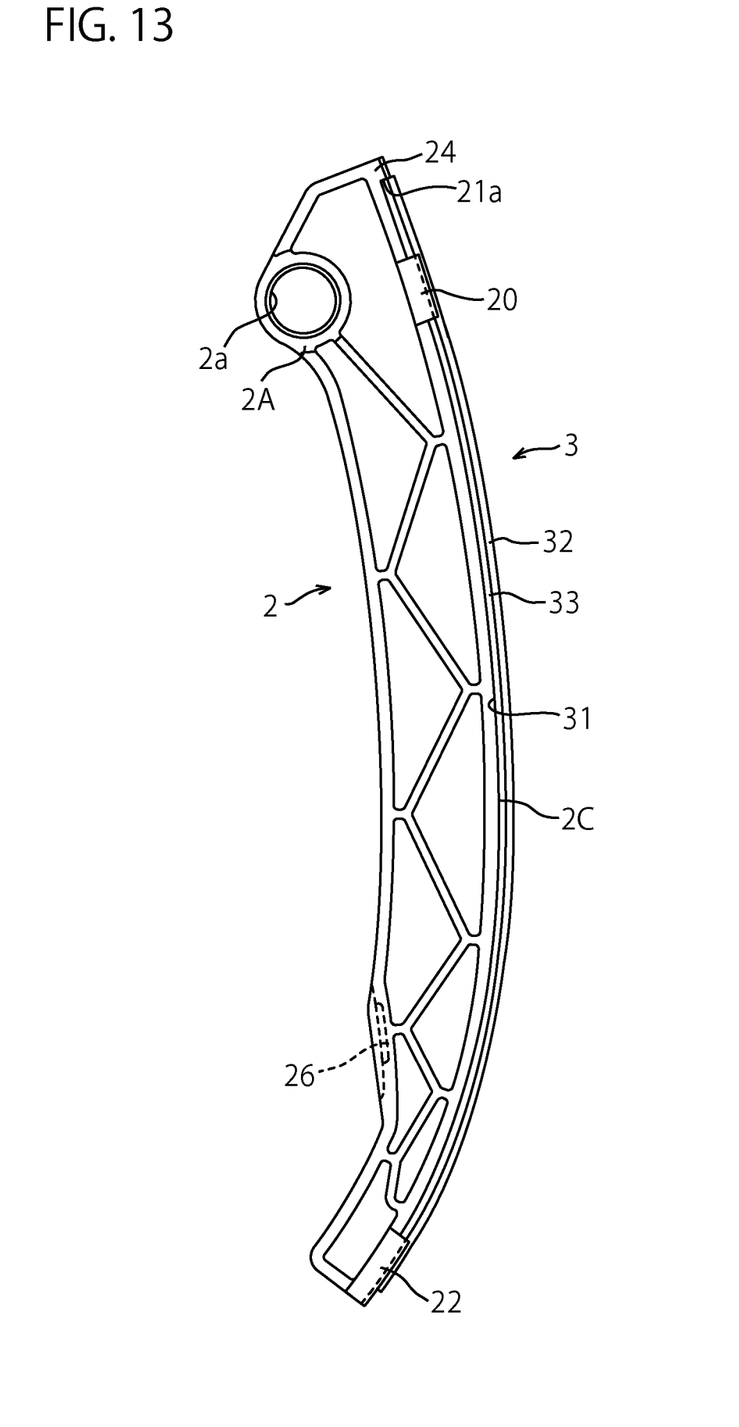
FIG. 13 illustrates a step in the assembly of the chain tensioner arm (FIG. 1).

From the abovementioned state, the region around the center of the shoe 3 is bent in order to insert the second end of the shoe 3 into the slit 23a in the locking part 23 provided at the second end (free end) of the tensioner arm main body 2, as shown in FIG. 12. Here, one widthwise end section at the second end of the shoe 3 is inserted into the slit 23a in the locking part 23 and is made to slide toward the second end of the tensioner arm main body 2. The other widthwise end section at the second end of the shoe 3 is then inserted into the slit 22a in the locking part 22 and is made to slide toward the second end of the tensioner arm main body 2. As a result, the shoe 3 is mounted on the upper surface 2C while tracing the arc-shaped upper surface 2C of the tensioner arm main body 2, as shown in FIG. 13, and the widthwise end sections at the first and second ends of the shoe 3 are locked by means of the locking parts 20, 21, 22, 23 of the tensioner arm main body 2. Here, a predetermined gap e is formed between the second end of the shoe 3 and the upright wall section 25 at the second end of the tensioner arm main body 2, as mentioned above (see FIG. 1). The shoe 3 is attached to the tensioner arm main body 2 in this way and the chain tensioner arm 1 is assembled.

In this exemplary embodiment, locking protrusions such as clips, tabs or hooks for locking the shoe 3 to the tensioner arm main body 2 are not provided on the end surface of the shoe 3 or on a surface on the rear side of the chain sliding surface 30, or at any other location, so the structure of the shoe 3 can be simplified. This not only makes it possible to reduce the cost of materials, the shoe 3 can also be molded using only upper/lower dies as the molding dies, so the cost of the dies can also be reduced and the manufacturing cost can be reduced as a result.

In the abovementioned exemplary embodiment, the shoe 3 extends linearly in the longitudinal direction so the flow direction of molten material can be arranged in a single direction when the shoe is molded by means of injection molding, and as a result the thickness t of the shoe 3 can be reduced to 1.5 mm or less, for example, so the cost of materials can be further reduced, while the cost of the dies can also be further reduced because the dies can be made thinner overall, which enables the manufacturing cost to be further reduced. It should be noted that when the shoe is curved into an arc shape in the conventional manner, the maximum thickness of a shoe which can be molded by means of injection molding is 2-3 mm. Furthermore, when the shoe 3 is molded by extrusion molding, it is possible to shorten the unit molding time and the manufacturing cost can be further reduced. In addition, the friction loss when the chain slides can be reduced by virtue of the fact that the shoe can be made thinner and it is possible to increase the limit PV value, which is to say that the abrasion resistance can be improved, and heat generated when the chain slides is readily released to the guide main body or the tensioner arm main body side, so it is possible to restrict an increase in the temperature of the shoe. In this case, it is possible to improve the friction resistance, wear resistance and heat resistance by means of an inexpensive construction whereby the shoe is made thinner, without the use of costly low-friction materials, low-abrasion materials or heat resistant materials.

In this exemplary embodiment, the shoe 3 has a uniform cross-sectional shape over the whole length so the structure of the shoe 3 can be further simplified and the manufacturing cost can be further reduced.

According to this exemplary embodiment, in order to attach the shoe 3 to the tensioner arm main body 2, the first end of the shoe 3 should be made to slide along the upper surface 2C of the tensioner arm main body 2 toward the pivoting end of the tensioner arm main body 2, after which the shoe 3 should be bent and the second end of the shoe 3 should be made to slide along the upper surface 2C of the tensioner arm main body 2 toward the free end of the tensioner arm main body 2, so it is a simple matter to assemble the chain tensioner arm 1.

The chain tensioner arm or chain guide provided with the abovementioned shoe may be used in an engine timing system, for example.

A preferred exemplary embodiment of the present invention has been described above, but the present invention is not limited to this application and a number of variant examples are included in the present invention. Several variant examples will be given below.

FIRST VARIANT EXAMPLE

The exemplary embodiment described above relates to an example in which the shoe 3 comprises a member extending linearly in the longitudinal direction, but this is not limiting for application of the present invention. The shoe 3 may equally comprise a member which curves in the shape of an arc. In this case also, not only can the structure of the shoe 3 be simplified and the cost of materials reduced by virtue of the fact that locking protrusions such as clips, tabs or hooks for locking the shoe 3 to the tensioner arm main body 2 are not provided on the shoe 3, the shoe 3 can also be molded using only upper/lower dies as the molding dies, so the cost of the dies can also be reduced and the manufacturing cost can be reduced as a result.

SECOND VARIANT EXAMPLE

The exemplary embodiment described above relates to an example in which the shoe 3 has a uniform cross-sectional shape over the whole length, but the present invention may likewise be applied to an arrangement in which the shoe 3 has a uniform cross-sectional shape at least in a region excluding the longitudinal end section thereof. To give an example of this, it would be feasible for the flat surface 34 formed on the widthwise end sections of the shoe 3 to be provided only in regions corresponding to the locking parts 20, 21, 22, 23 of the tensioner arm main body 2 at the longitudinal end sections of the shoe 3, and for the flat surface 34 not to be provided in other regions, for example. Alternatively, the present invention may equally be applied to an arrangement in which the shoe 3 does not have a uniform cross-sectional shape. To give an example of this, it would be feasible for the guides 32 to be provided intermittently (i.e., with a plurality of guides being provided in the longitudinal direction) along the chain sliding surface 30, rather than a pair of guides 32 formed on the chain sliding surface 30 of the shoe 3 being provided continuously in the longitudinal direction of the chain sliding surface 30, and for the guides 32 to be offset and staggered rather than facing each other in the widthwise direction.

OTHER VARIANT EXAMPLES

The abovementioned exemplary embodiment and variant examples should only be considered simple examples of the present invention in all aspects and are not limiting. A person skilled in the art of the present invention faced with the abovementioned teaching will be capable of arriving at a number of variant examples and other exemplary embodiments employing the principle of the present invention without departing from the spirit or the basic characterizing part of the present invention.

OTHER EXAMPLES OF APPLICATION

The abovementioned exemplary embodiment relates to an example in which the present invention is applied to an engine timing system, but the present invention may likewise also be applied to other chain devices, e.g. an auxiliary drive chain for an engine such as a balancer chain or an oil pump drive chain.

FIELD OF INDUSTRIAL APPLICATION

The present invention is of use in a shoe for a chain guide or for a chain tensioner arm and is especially suitable where a simpler structure is required.

KEY TO SYMBOLS

1 . . . Chain tensioner arm
2 . . . Tensioner arm main body
20-23 . . . Locking part
20a-23a . . . Slit (locking recess)
3 . . . Shoe
30 . . . Chain sliding surface

PRIOR ART DOCUMENTS

Patent Documents

[Patent Document 1] JP 2000-97300 A (see paragraph [0016] and FIG. 1, FIG. 2 and FIG. 4 to FIG. 6)

The invention claimed is:

1. A chain guide for guiding travel of a chain on a tension-side span comprising:
a guide comprising a main body having a first end, a second end and an upper surface extending in a longitudinal direction, the upper surface comprising at the first end, a first upper surface end with a first upright wall section and a plurality of locking parts arranged offset from each other across a width of the main body and perpendicular relative to the first upright wall section, each of the plurality locking parts defining a slit, and at the second end, a second upper surface end with a second upright wall section and a plurality of the locking parts arranged offset from each other across the width of the main body of the guide and perpendicular relative to the second upright wall section, each of the plurality of locking parts defining a slit; and
a shoe having a first end and a second end separated by a length, a lower surface, a chain sliding surface opposite the lower surface, a width defined by widthwise end surfaces, a pair of guide rails on the chain sliding surface offset inwards from the widthwise end surfaces, and a pair of flat surfaces with a reduced thickness, each flat surface of the pair of flat surfaces defined between the widthwise end surfaces and a guide rail of the pair of guide rails;
wherein the pair of flat surfaces defined between the widthwise end surfaces and the pair of guide rails of the shoe are received by the slits defined by each of the plurality of locking parts at the first end and the second end arranged offset from each other across the width of the main body of the guide.

2. The chain guide of claim 1, wherein only the flat surface of the shoe is received within the slits defined by the plurality of locking parts of the main body at the first end and the second end of the main body of the guide.

3. A chain tensioner arm for applying a tensioning force to a slack-side span of a chain said chain tensioner arm comprising:
a tensioner arm comprising a main body having a first end with a pivot hole, a second end and an upper surface extending in a longitudinal direction, the upper surface comprising at the first end, a first upper surface end with a first upright wall section and a plurality of locking parts arranged offset from each other across a width of the main body and perpendicular relative to the first upright wall, each of the plurality of locking parts defining a slit, and at the second end, a second upper surface end with a second upright wall section and a plurality of the locking parts arranged offset from each other across the width of the main body and perpendicular relative to the first upright wall, each of the plurality of locking parts defining a slit;

a shoe having a first end and a second end separated by a length, a lower surface, a chain sliding surface opposite the lower surface, a width defined by widthwise end surfaces, a pair of guide rails on the chain sliding surface offset inwards from the widthwise end surfaces, and a pair of flat surfaces with a reduced thickness, each flat surface of the pair of flat surfaces defined between the widthwise end surfaces and a guide rail of the pair of guide rails; and wherein the pair of flat surfaces defined between the widthwise end surfaces and the pair of guide rails of the shoe are received by the slits defined by plurality of locking parts at the first end and the second end arranged offset from each other across the width of the main body of the tensioner arm.

4. The chain tensioner arm of claim 3, wherein only the flat surface of the shoe is received within the slits defined by the plurality of locking parts of the main body at the first end and the second end of the main body of the tensioner arm.

5. A method of assembling a tensioner arm, comprising:
molding a flat shoe having a first end and a second end separated by a length, a lower surface, a chain sliding surface, opposite the lower surface, a width defined by widthwise end surfaces, a pair of guide rails on the chain sliding surface offset inwards from the widthwise end surfaces, and a pair of flat surfaces with a reduced thickness, each flat surface of the pair of flat surfaces defined between the widthwise end surfaces and a guide rail of the pair of guide rails;
providing an arm comprising a main body having a first end with a pivot hole, a second end and an upper surface for receiving the shoe, the upper surface being arced and extending in a longitudinal direction, the upper surface comprising a first upper surface end with a first upright wall section and a plurality of locking parts arranged offset from each other and perpendicular relative to the first upright wall section, each of the plurality of locking parts defining a slit, and a second upper surface end with a second upright wall section and a plurality of the locking parts arranged offset from each other and perpendicular relative to the second upright wall section, each of the plurality of locking parts defining a slit;
inserting the first end of the shoe into the first upper surface end of the tensioner arm, wherein the lower surface of the shoe contacts the upper surface of the tensioner arm, such that the pair of flat surfaces between the widthwise end surfaces and the pair of guides of the shoe are received by the slits of the locking parts of the first upper surface end of the tensioner arm and slid towards the first upper surface end until the first end of the shoe abuts the first upright wall section of the tensioner arm; and
bending the shoe to insert the second end of the shoe into the second upper surface end of the tensioner arm, wherein the lower surface of the shoe contacts the upper surface of the tensioner arm, such that the pair of flat surfaces between the widthwise end surfaces and the pair of guides of the shoe are received by the slits of the locking parts of the second upper surface end of the tensioner arm and slid towards the second upper surface end until the second end of the shoe abuts the second upright wall section of the tensioner arm.

6. The method of claim 5, wherein the shoe has a uniform cross-sectional shape at least in a region excluding the first end and the second end of the shoe.

7. The method of claim 5, wherein the shoe has a uniform cross-sectional shape over an entire length.

8. The method of claim 5, wherein molding a tensioner arm further comprises:
molding a non-uniform cross sectional shaped flat shoe comprising the width defined by the widthwise end surfaces, the pair of guides provided in the longitudinal direction of the chain sliding surface, wherein the pair of guides are provided intermittently along the chain sliding surface.

9. The method of claim 5, wherein the shoe is made of a specific resin material selected from a group consisting of: polyamide 66, polyamide 46, polyamide 66 and polytetrafluoroethylene, and polyamide 46 and polytetrafluoroethylene.

10. The method of claim 5, wherein the shoe is produced by an injection molding or an extrusion molding.

11. The method of claim 10, wherein the molding is extrusion molding and uses a resin with a high viscosity material.

12. The method of claim 10, wherein the molding is injection molding and uses a low viscosity material.

13. The method of claim 10, wherein the injection molding uses an upper die and a lower die to mold the shoe.

* * * * *